Patented June 14, 1927.

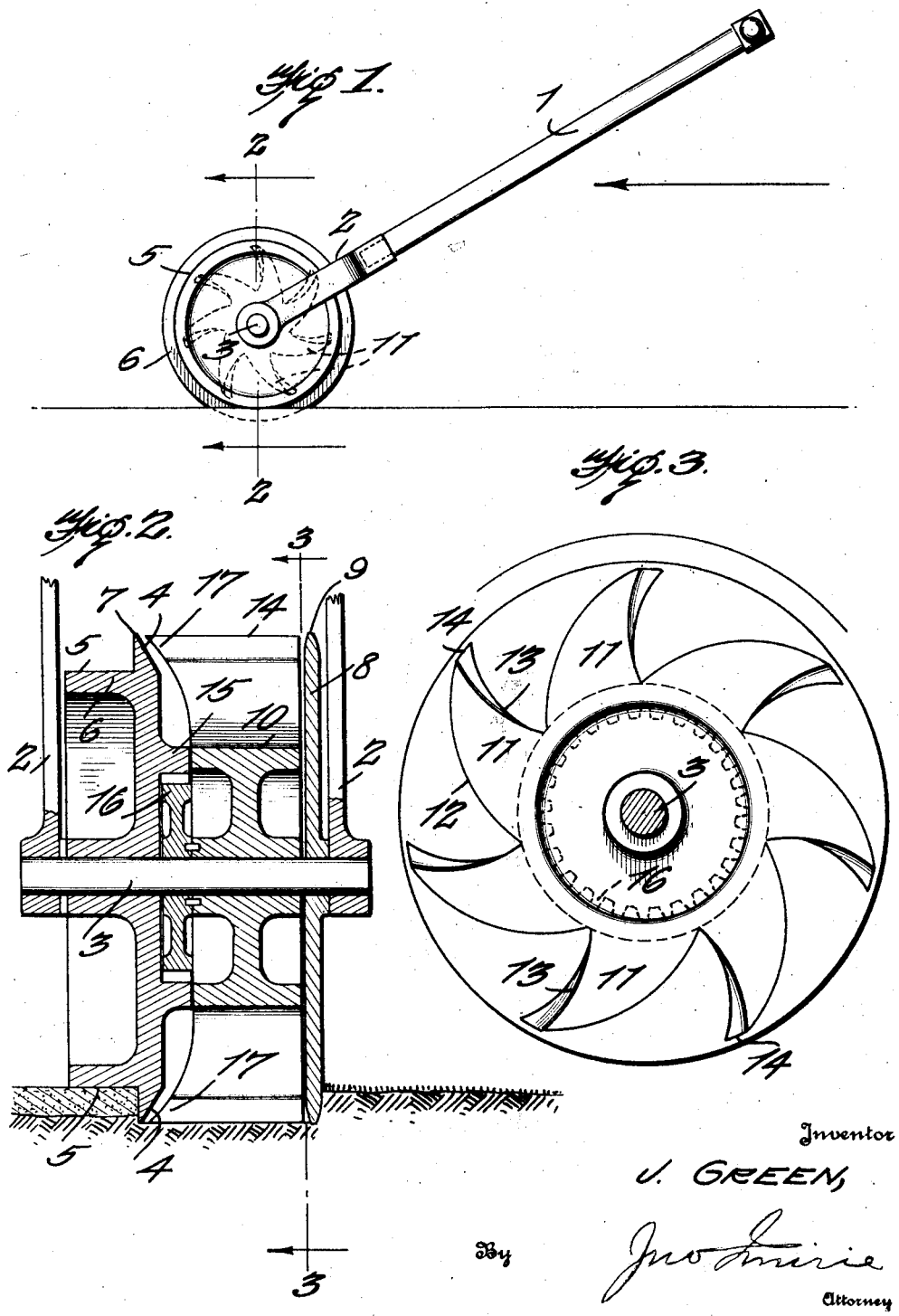

1,632,129

UNITED STATES PATENT OFFICE.

JACK GREEN, OF NORFOLK, VIRGINIA.

LAWN-EDGE TRIMMER.

Application filed August 30, 1926. Serial No. 132,633.

This invention relates to an improvement in lawn edge trimmers, wherein provision is made for accurately guiding the trimmer in operation and for providing a clean line of demarkation between the lawn and pavement while at the same time substantially destroying all vegetation in this line.

Lawn edge trimmers have been heretofore proposed to trim or cut the grass and vegetation in an even manner at the juncture between the lawn and pavement, but as such trimmers are primarily designed to trim or cut the grass and vegetation above the surface of the ground, the results remain effective for but a short time.

The main object of the present invention is the provision of a trimmer of this character in which the cutters are designed to cut below the surface of the ground throughout an area of appreciable width between the lawn and sidewalk, thus entirely destroying the vegetation throughout this line and leaving a clear space between the lawn and sidewalk which is wholly free of any growing vegetation and which will remain in this condition for a considerable length of time.

A further object of the invention is to provide means in addition to the cutting element for the vegetation, which shall cut into the surface of the ground at the sides of the area to be cleared, to thereby sharply define the sides of such area, and render the effect of the implement as a uniform clearly defined clear space.

The invention is illustrated in the accompanying drawings, in which:

Fig. 1 is a view in side elevation of the improved implement.

Fig. 2 is an enlarged section on the line 2—2 of Fig. 1.

Fig. 3 is a section on line 3—3 of Fig. 2.

The improved implement comprises a handle portion 1 terminating in a yoke 2, the ends of which rigidly support an axle or shaft 3. Freely rotatable on the shaft immediately adjacent one of the arms of the yoke is what may be termed a guide roller 4, having a peripheral bearing surface 5 and an outstanding edge flange 6, the latter being remote from the adjacent yoke arm. The inner surface of the flange 6 and the bearing surface 5 form an approximate right angle, the outer surface of the flange being inclined, to render the peripheral edge of the flange more or less sharpened as indicated at 7. A cutting disc 8 is also loosely mounted on the shaft 3 immediately adjacent the remaining arm of the yoke, the peripheral edge 9 of this disc being in line with the peripheral edge 7 of the flange 6 and being more or less sharpened for cutting purposes.

Intermediate the guide roller 4 and the disc 8 is arranged a cutter comprising a body portion 10 and a series of blades 11 radiating from the peripheral edge of the body portion. These blades 11 are of the full width of the space between the guide roller and disc 8 with their rear surfaces 12 curved on a radius somewhat less than their front surfaces 13. The cutting edges 14 of these blades are at the free terminals of the blades, that is, extend across between the guide roller and disc, and in edge view these cutting edges are gradually curved in the forward direction from a point adjacent the guide roller toward the disc. Thus the cutting edges operate in effect at an angle somewhat less than a right angle to either the guide roller or disc, facilitating the cutting operation, and of necessity rendering the depth of the surface cut slightly less adjacent the disc than at the guide roller.

The guide roller and cutter are geared through intermediate gearing, for example through an internal gear 15 on the guide roller cooperating with the pinion 16 fixed on the cutter. The gearing detail is unimportant so long as it is arranged between the guide roller and cutter, and so long as it imparts a revolution to the cutter which is in excess of the revolution of the guide roller. Where an internal gear is used on the guide roller, requiring an additional space between such roller and the cutter, the cutting edges 14 may if desired, be laterally extended to take up this additional space as indicated at 17 in Fig. 2, to render the cutting operation effective throughout the full space between the guide roller and disc.

In use the device is operated by arranging the bearing surface 5 of the guide roller on the pavement with the straight edge of the flange bearing against the edge of the pavement. The cutter and disc thus extend over the surface of the ground toward the lawn. As the device is propelled on the pavement the guide roller is of course revolved, causing the cutter with its increased revolution to dig or cut into the surface of the ground, defining a channel and clearly and sharply removing all vegetation from such area.

The sharpened edge 7 of the flange 6 of the guide roller cuts into the ground immediately at the edges of the line of operation of the cutter, thus clearly and sharply defining such edges, and rendering the excavated portion as a comparatively shallow channel with the edges straight and even. It will be further noted that the edge flange 6 of the guide roller additionally serves as a shield to prevent the cutter, or the cutting edges thereof, coming into contact with the material forming the pavement, and on which the guide roller travels.

There is thus defined an even shallow channel between the lawn and pavement which by reason of the fact that the cutter operates below the surface of the ground is entirely clear of vegetation, and generally of the roots of such vegetation. Thus the edge of the lawn will remain straight and even for a very much longer time than ordinarily with the usual lawn edge trimmer.

What is claimed is:

1. A lawn edge trimmer including a handle, a shaft carried by the handle, spaced cutting disks loosely mounted on the shaft, one of said disks being provided with a roller extension to impart movement to the disk in the operation of the trimmer, and a cutter mounted loosely on the shaft between the disks and driven from the operated disk.

2. A lawn edge trimmer including a handle, a shaft carried by the handle, spaced cutting disks loosely mounted on the shaft, one of said disks being provided with a roller extension to impart movement to the disk in the operation of the trimmer, and a cutter mounted loosely on the shaft between the disks and driven from the operated disk, said cutter comprising cutting edges substantially parallel to the shaft and substantially in line with the cutting edges of the disks.

3. A lawn edge trimmer having a handle-carried shaft, spaced cutting disks loose upon the shaft, one of said disks having a laterally extended roller of less diameter than that of the disk and presenting with the disk a right angled surface to serve as a rolling guide for the trimmer, a cutter having its cutting edges substantially parallel to the shaft and loosely mounted on the shaft between and serving to maintain the spacing of the disks, and gearing intermediate one of the disks and cutter to operate the latter in the movement of the disk.

4. A lawn edge trimmer comprising a handle, a shaft supported thereby, a guide roller freely rotatable on the shaft, and having a ground cutting flange, a ground cutting disc mounted on the shaft remote from the guide roller, and a ground digging cutter arranged on the shaft between the guide roller and disc and operated in the movement of the guide roller, the cutter presenting cutting edges substantially parallel to the shaft.

5. A lawn edge trimmer comprising a handle, a shaft supported thereby, a guide roller freely rotatable on the shaft, and having a ground cutting flange, a ground cutting disc mounted on the shaft remote from the guide roller, and a ground digging cutter arranged on the shaft between the guide roller and disc and operated in the movement of the guide roller, the cutter presenting cutting edges substantially parallel to the shaft, and gearing intermediate the guiding roller and cutter to operate the latter in the movement of the former.

In testimony whereof I affix my signature.

JACK GREEN.